United States Patent

[11] 3,597,807

| [72] | Inventor | Kouzo Yasuoka<br>c/o Suikoh Komori No. 17 Shibuse-cho,<br>Kitashiraka, Kyoto, Japan |
|---|---|---|
| [21] | Appl. No. | 829,212 |
| [22] | Filed | June 2, 1969 |
| [45] | Patented | Aug. 10, 1971 |
| [32] | Priority | Aug. 26, 1968 |
| [33] | | Japan |
| [31] | | 43/61023 |

[54] FASTENING DEVICE AND A PROCESS FOR MAKING THE SAME
3 Claims, 7 Drawing Figs.

| [52] | U.S. Cl. | 24/87 |
|---|---|---|
| [51] | Int. Cl. | A44b 9/12 |
| [50] | Field of Search | 24/87, 87 TB, 103, 160 |

[56] References Cited
UNITED STATES PATENTS

| 253,901 | 2/1882 | Weidenmann | 24/160 X |
|---|---|---|---|
| 687,326 | 11/1901 | Meyer | 24/160 |
| 897,976 | 9/1908 | Germann | 24/87 UX |
| 1,315,369 | 9/1919 | Klinge | 24/87 |
| 3,066,369 | 12/1962 | Anderson | 24/103 |

FOREIGN PATENTS

| 380,266 | 9/1923 | Germany | 24/103 |
|---|---|---|---|

*Primary Examiner*—Donald A. Griffin
*Attorney*—Wenderoth, Link & Ponack

ABSTRACT: An archwise-curved needle has a basic portion which is on a level with the surface of a fastening device, and which is pivotally attached to said body. Said curved needle is so provided as to go through the back of said body. Said body is also provided with an elastic piece to restrain by its elasticity the pivotal movement of said curved needle.

Patented Aug. 10, 1971  3,597,807

KOUZO YASUOKA,
INVENTOR

BY Wenderoth, Lind & Ponak
ATTORNEYs

FASTENING DEVICE AND A PROCESS FOR MAKING THE SAME

An object of this invention is to provide a fastening device which is capable of firmly fastening a substance to the surface of an object without sewing.

Another object of this invention is to provide a fastening device which will not come off even when it is brought into contact with any substance.

Another object of this invention is to provide a fastening device which is capable of being fixed or removed quite easily as occasion demands.

Another object of this invention is to provide a fastening device which does not prick one's finger during use.

Another object of this invention is to provide a fastening device which is suitable for mass production.

Another object of this invention is to provide a process for producing a fastening device having the above-mentioned advantages.

The attached drawings show preferred embodiments of this invention wherein:

FIGS. 1–4 show an embodiment of this invention described in Example 1.

FIGS. 5–7 show a second embodiment of this invention described in Example 2.

Figure 1:
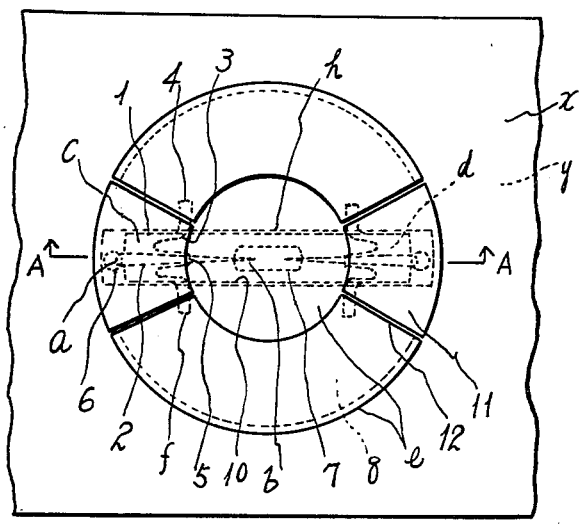
FIG. 1 is a plan view.
Figure 2:
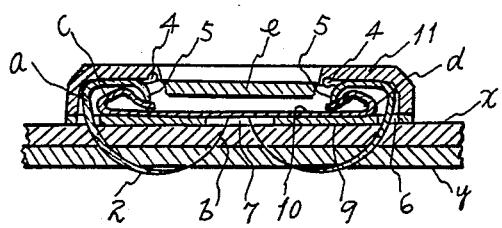
FIG. 2 is a section taken on line A-A of FIG. 1 after completion of a fastening operation.

In fastening a plurality of cloths together, such as a cover and bed clothes or a cover and the seat of a chair, or in fastening substances with badges, several fastening devices have hitherto been used, namely: the primitive method of sewing them together; buttons which must be sewn on; safety pins which stick the both portions together; a fastening device having on one side a curved stationary needle which pierces through covers and fixes them; a spiral needle which fixes covers.

In the case of the most primitive method of sewing things together, it is widely known that a considerable labor is required both for fixing and for removing. In the case of using buttons, it requires a considerable labor to sew on buttons. It is also very troublesome to remove buttons. In particular, it requires a great deal of labor to handle a large quantity of objects.

In the case of using safety pins, the whole device is exposed outside, which makes it quite unattractive. In the case of fastening a cover by the insertion of a curved needle fixed on the back of a cover fastening device, said curved needle is apt to fall off and be quite easily lost. What is more, said fastening device is apt to pierce through its user's hand and to be broken quite easily.

In the case of using a cover fastening device by means of a spiral needle, its fixing and removing operations are very difficult. Besides, this fastening device has another defect in that it is apt to be broken quite easily. Thus, there has hitherto been no fastening device which is quite suitable for fastening the united portion between clothing and other items, for fastening or unfastening bed covers or chair covers, and for fastening or removing badges, which does not injure its appearance, which does not prick one's finger when it is used, and which can be fixed or removed quite easily. Thus, it has been impossible to satisfy the demand for such a fastening device.

The device of this invention, however, can be used in any of the above cases. It requires no sewing when it fastens substances together. It does not come off against the will of its user. What is more, the device of this invention is durable and quite suitable for mass production. With reference to the attached drawings, the invention is illustrated in the following Examples:

Example 1

The numeral 1 designates a basic plate which is formed by stamping out a steel plate. Its long and narrow extreme portion is stamped out, is curved downwardly nd archwise, and is tempered to form a curved needle 2. The numeral 4 is an axial lever which is formed by stamping out a basic end 3 of said basic plate 1 in both the left and right directions in a protrusive manner. The middle portion of each of the two axial levers 4 and 4 is stamped out, and each stamped-out portion is curved downwardly to form a protrusive piece 5. The above-mentioned stamping out operations are simultaneously carried out in one process. Thus, the product of this invention is quite suitable for its mass production. The numeral 8 designates a disclike bottom plate in which there are provided punched holes 6 and 7 through which the basic and extreme ends "a" and "b" of the curved needle 2 are capable of passing with ease. An elastic piece 10 having upwardly elastic ends "c" and "d" is inserted into a hollow portion "h" provided on the upper surface of said bottom plate 8. The numeral 11 designates a decorative plate which is affixed to the surface of said basic plate 1. Said decorative plate 11 may be in any shape which goes well with the overall decorative design. The letter "e" designates a surface plate which has approximately the same shape as that of the bottom plate. The numeral 12 is a cutout portion of the surface plate 11. There is provided bearing holes "f" facing said cutout portion 12. It is more efficient when said bottom plate 8 and surface plate "e" are fit in each other so as to make one integral body by means of suitable plastics. The fastening device of this invention have such parts as mentioned above.

In assembling them, the surface plate "e", on which the axial lever 4 is inserted into the bearing "f" and the decorative plate 11 is inserted into the cutout portion 12, is placed on the bottom plate 8, on the upper surface of which is placed the elastic piece 10. The curved needle 2 is passed through punched holes 6 and 7. The bottom and surface plate 8 and "e" are adhered to each other to form one integral body by means of adhesives.

Figure 3:
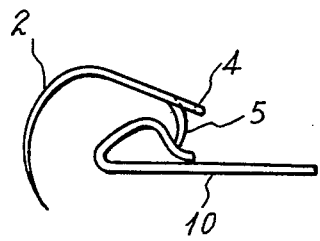
FIG. 3 is a side elevation of the important part of this fastening device which is in its unfastening position.
Figure 4:
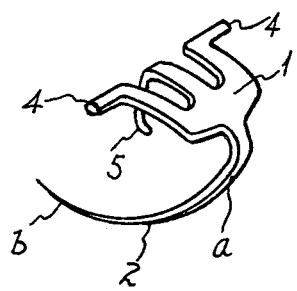
FIG. 4 is a perspective view of a curved needle device.
Figure 5:
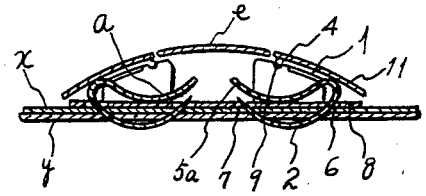
FIG. 5 is a section after completion of a fastening operation with the embodiment described in Example 2.
Figure 6:
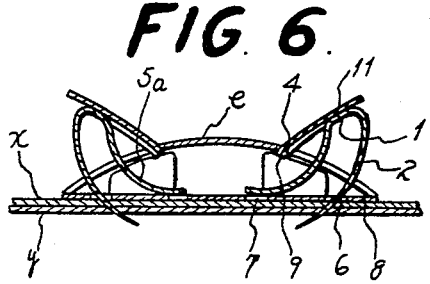
FIG. 6 is a section showing this fastening device which is in its unfastening position.
Figure 7:
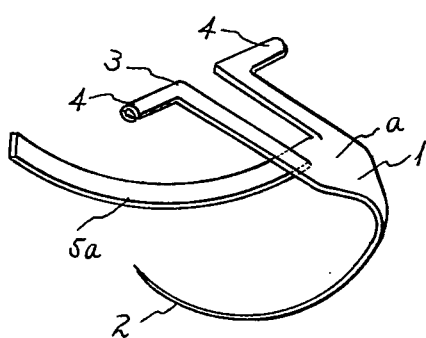
FIG. 7 is a perspective view of a curved needle device.

Here the protrusive piece 5 is made elastic by being brought into contact with the elastic piece 10 lightly. What is more, the curved needle 2 goes first through the punched hole 6 to the lower part of the bottom plate 8, and the extreme end thereof goes further through the punched hole 7 and enters on the bottom plate 8. In using this fastening device, its bottom plate 8 is placed on two objects "x" and "y" which are placed one above another, and the outer ends of the two decorative plates 11 and 11 are pushed upwardly by one's fingertip. By this action said decorative plate 11 and the basic plate 1 move pivotally with the axial levers 4 and 4 as an axis, and the curved needle goes upwardly and retires on the back plate 8. This pushing operation by one's fingertip causes the protrusive piece 5 to push the elastic piece 10 producing a strong elastic resistance. Next, when the pushing power of one's fingertip is released, the elasticity of the elastic piece 10 pushes the protrusive piece 5 and causes the decorative plate 11 to recover itself rapidly by elasticity to a status in which said plate 11 is on a level with the surface plate "e." By these operations the curved needle 2 passes the status as shown in FIG. 3, and goes through the punched hole 6 as shown in FIG. 3, and penetrates the objects "x" and "y" from their surface to their back, and again penetrates them from their back to their surface. Finally, the extreme point of the needle 2 goes through the punched hole 7 and enters on the bottom plate 8, that is, goes through to the inside of the fastening device. By so doing the needle 2 embraces and fixes the objects "x" and "y." By such a simple action, this device achieves an excellent effect as a fastening device. At that time the decorative plate 11 is inserted into the cutout portion 12 of the surface plate "e"; and as the surface of the surface plate "e" is on a level with that of the decorative plate 11, they pivotally move as if they were a single body without being fallen apart from each other even if they are brought into contact with any other substance. Thus, the curved needle continues to maintain its holding condition, functioning as a part of a stable fastening device at all times.

Unless external power is applied intentionally to the decorative plate 11, the extreme point of the curved needle 2 which penetrates an object is always on the bottom plate 8 extending through the punched hole 7, that is, within the fastening device. Thus, there is no danger that its extreme point pierces any substance through.

In removing the needle 2, if the outer side of the decorative plate is pushed upwardly, the protrusive piece 5 moves against the elasticity of the elastic piece. Then, the extreme point "a" of the curved needle 2 leaves the objects "x" and "y," and retrudes into the punched hole 6. Thus, the connection between the fastening device and objects is easily removed. The fastening device of this invention has an attractive appearance, and also has a remarkable effect as a safe and easy-to-use fastening device.

Example 2

In this example, an elastic piece 5a is used instead of the protrusive piece 5 in Example 1. The elastic piece 5a is formed by stamping out a long narrow strip with the central portion of the basic plate 1 being not stamped out. The lower portion of the piece 5a is elastic and is curved. As the fastening device of this Example 2 is provided with said elastic piece 5a, it is also not provided with the elastic piece 10 in Example 1. The other component parts in this Example are more or less the same as in Example 1.

The fastening device of this invention can be used not only in fastening small-sized objects such as badges, buttons, etc., but also in fastening large-sized packages. In the case of the latter purpose, a larger and stronger fastening device of this invention is employed. In the latter use, the device of this invention contributes greatly to improving the efficiency of packaging.

What I claim is:

1. A fastening device comprising a bottom plate having therein a central punched hole and two punched holes radially outward of said central punched hole, a surface plate attached to said bottom plate and having a pair of cutout portions therein, a pair of arched needles each having axial levers rotatably positioned within said surface plate and a protrusive piece curved in the direction of the curve of said needles, and an elastic piece positioned between said bottom plate and said protrusive pieces, said needles being resiliently urged to extend downwardly through said two radially outward punched holes and upwardly through said central punched hole.

2. A process for manufacturing a fastening device which comprises stamping out simultaneously a long and narrow portion for a curved needle at the extreme portion of a continuous needle material, a projection for an axial lever at both ends thereof, and a protrusive piece in approximately the middle portion of said axial levers thereof respectively, the extreme point of said long and narrow portion for a curved needle being sharpened and curved archwise and then being tempered, said protrusive piece being curved in the direction of said curved needle; providing a bottom plate having an elastic piece on its upper surface and a punched hole for the curved needle; providing a surface plate having bearing holes for said axial levers and a cutout portion into which the basic portion of said curved needle is inserted on a level with the surface of the main body; and adhering and fixing the bottom and surface plates firmly.

3. A process as claimed in claim 2 wherein said elastic piece is an extension of said protrusive piece.